(12) United States Patent
Shaw et al.

(10) Patent No.: US 8,770,424 B1
(45) Date of Patent: Jul. 8, 2014

(54) LUMINESCENT WALL PLATE

(76) Inventors: David I-Hung Shaw, San Francisco, CA (US); Jane Kuo Shaw, San Francisco, CA (US)

( * ) Notice: Subject to any disclaimer, the term of this patent is extended or adjusted under 35 U.S.C. 154(b) by 0 days.

(21) Appl. No.: 13/554,488

(22) Filed: Jul. 20, 2012

Related U.S. Application Data

(60) Provisional application No. 61/511,072, filed on Jul. 24, 2011.

(51) Int. Cl.
*H02G 3/14* (2006.01)

(52) U.S. Cl.
USPC .............................. 220/242; 220/4.02; 220/3.5

(58) Field of Classification Search
USPC ............ 220/241, 242, 4.02, 3.2, 3.3, 3.5, 3.8; 250/214 AL
See application file for complete search history.

(56) References Cited

U.S. PATENT DOCUMENTS

| | | | |
|---|---|---|---|
| 1,246,080 A | 11/1917 | Frank | |
| 1,316,985 A | 9/1919 | Van Amberg | |
| 2,428,167 A * | 9/1947 | Linton | 362/95 |
| 2,575,820 A * | 11/1951 | Linton | 362/95 |
| 2,650,262 A | 8/1953 | Abbott | |
| 3,478,209 A | 11/1969 | Feuer | |
| 4,000,405 A * | 12/1976 | Horwinski | 362/95 |
| 4,745,286 A | 5/1988 | Jones | |
| 4,774,641 A * | 9/1988 | Rice | 362/95 |
| 4,835,343 A * | 5/1989 | Graef et al. | 174/66 |
| 5,008,551 A | 4/1991 | Randolph | |
| 5,415,911 A | 5/1995 | Xampa et al. | |
| 5,481,442 A * | 1/1996 | Dickie et al. | 362/95 |
| 5,670,776 A * | 9/1997 | Rothbaum | 250/214 AL |
| 5,683,166 A * | 11/1997 | Lutzker | 362/84 |
| 6,023,021 A * | 2/2000 | Matthews et al. | 174/66 |
| 6,051,787 A * | 4/2000 | Rintz | 174/66 |
| 6,087,588 A * | 7/2000 | Soules | 174/66 |
| 6,183,101 B1 * | 2/2001 | Chien | 362/84 |
| 6,350,039 B1 * | 2/2002 | Lee | 362/95 |
| 6,355,885 B1 * | 3/2002 | Rintz et al. | 174/66 |
| 6,423,900 B1 * | 7/2002 | Soules | 174/66 |
| 6,547,411 B1 * | 4/2003 | Dornbusch | 362/95 |
| 6,578,980 B1 * | 6/2003 | Chen et al. | 362/95 |
| 6,765,149 B1 * | 7/2004 | Ku | 174/66 |
| 6,921,179 B2 * | 7/2005 | Diak Ghanem | 362/84 |
| 7,009,111 B1 * | 3/2006 | Rintz | 174/66 |
| 7,011,422 B2 * | 3/2006 | Robertson et al. | 362/95 |
| 7,026,550 B2 * | 4/2006 | McBain | 174/67 |

(Continued)

OTHER PUBLICATIONS

"Glow-in-the-dark Switch Plates" product image, from Hampton's.

(Continued)

*Primary Examiner* — Fenn Mathew
*Assistant Examiner* — Christopher McKinley
(74) *Attorney, Agent, or Firm* — QuickPatents; Kevin Prince

(57) ABSTRACT

A wall plate is disclosed for use with a switch that is mounted in a wall receptacle in a wall. A plate that is made from a transparent material has embedded therein a composition of powdered photoluminescent material. The plate includes a front surface, a back surface, and at least one aperture for accepting the switch therethrough and for mounting the plate. The back surface of the plate includes a recessed area for receiving a gasket configured to fit at least partially within the recessed area of the plate. The gasket further includes the apertures therethrough, coaligned with the apertures of the plate. Preferably the gasket is a white, closed-cell foam material.

7 Claims, 4 Drawing Sheets

(56) References Cited

U.S. PATENT DOCUMENTS

| | | | | |
|---|---|---|---|---|
| 7,036,948 | B1 * | 5/2006 | Wyatt | 362/95 |
| 7,207,687 | B1 * | 4/2007 | Reilly | 362/95 |
| 7,270,436 | B2 * | 9/2007 | Jasper | 362/95 |
| 7,273,983 | B1 * | 9/2007 | Rintz | 174/66 |
| 7,399,921 | B2 * | 7/2008 | McBain | 174/67 |
| 7,547,131 | B2 * | 6/2009 | Faunce | 362/641 |
| 7,549,785 | B2 * | 6/2009 | Faunce | 362/641 |
| 7,850,322 | B2 * | 12/2010 | Glazner et al. | 362/95 |
| 8,003,886 | B1 * | 8/2011 | Rintz | 174/66 |
| D661,176 | S * | 6/2012 | Schindler | D8/353 |
| 8,304,652 | B2 * | 11/2012 | McBain | 174/67 |
| 8,393,747 | B2 * | 3/2013 | Kevelos et al. | 362/95 |
| 2006/0038161 | A1 * | 2/2006 | Alfonso et al. | 252/301.36 |
| 2007/0125780 | A1 * | 6/2007 | Shiina et al. | 220/23.87 |
| 2007/0171625 | A1 * | 7/2007 | Glazner | 362/95 |
| 2007/0291469 | A1 * | 12/2007 | Chen | 362/95 |
| 2010/0033951 | A1 * | 2/2010 | Luginbuhl | 362/95 |
| 2011/0154881 | A1 * | 6/2011 | Ascheman et al. | 73/1.06 |

OTHER PUBLICATIONS

"Find a light" product image, from ReGlo, at Re-Glo.com.

* cited by examiner

LUMINESCENT WALL PLATE

CROSS-REFERENCE TO RELATED APPLICATIONS

This application claims the benefit of U.S. Provisional Patent Application 61/511,072, filed on Jul. 24, 2011, and incorporated herein by reference.

STATEMENT REGARDING FEDERALLY SPONSORED RESEARCH AND DEVELOPMENT

Not Applicable.

FIELD OF THE INVENTION

This invention relates to electrical wall plates, and more particularly to a luminescent wall plate.

DISCUSSION OF RELATED ART

Luminescent wall plates for switch receptacles, and the like, are known in the art, such as in the following prior art patent references:

| Pub. No. | Inventor | Pub. Date |
| --- | --- | --- |
| 1,246,080 | Frank | Nov. 13, 1917 |
| 1,316,985 | Van Amberg | Sep. 23, 1919 |
| 2,650,262 | Abbott | Aug. 25, 1953 |
| 3,478,209 | Feuer | Nov. 11, 1969 |
| 4,745,286 | Jones | May 17, 1988 |
| 5,008,551 | Randolph | Apr. 16, 1991 |
| 5,415,911 | Zampa et al. | May 16, 1995 |
| 5,670,776 | Rothbaum | Sep. 23, 1997 |
| 2006/0,038,161 | Alfonso et al. | Feb. 23, 2006 |
| 2010/0,033,951 | Luginbuhl | Feb. 11, 2010 |

In Randolph (U.S. Pat. No. 5,008,551) a switch cover plate is disclosed having an admixture of a phosphorescent powder and a carrier, such as epoxy resin. Such a device suffers from the drawback of having partial transparency, which not only decreases the visibility of the luminescent plate, making it appear dull in bright-light conditions due to the inherent darkness of the switch or outlet box behind the plate, but also renders the unaesthetic switch, wire, and switch receptacle partially visible though the wall plate.

Several such prior art luminescent wall plates incorporate a relatively small amount of photoluminescent material, shortening their illumination time and rendering them non-luminescent sometime during the nighttime hours when visible illumination is most desired. Further, prior art luminescent plates do not efficiently utilize the light traversing through the plate nor do they recycle emitted glow light from the plate to optimize luminescent performance in terms of brilliance and duration directed outwardly into the room.

In Luginbuhl (US 2010/0033951) a switch cover plate is disclosed having a photoluminescent object positioned behind the switch cover plate in a recess formed therein. In such a prior art device, the brilliance of the photoluminecent object is diminished by the cover plate that has no photoluminescent powder itself. Further, light from such an object is not well distributed in the room and is only strongly visible from immediately in front of the switch cover plate. None of the prior art luminescent devices teach a reflective backing for both increasing the luminosity of the device into the room, but also shield observers from seeing behind the necessarily non-opaque switch plate.

Therefore, there is a need for an aesthetically pleasing device that provides enhanced visibility, stronger luminescence and longer illumination time. Such a needed device would provide a means to reflect and utilize photoluminescent pigment charging light with the utmost efficiency and be easily visible from generally any angle within the room. Such a device would further provide energy saving and safety benefits such as thermal, draft and electrical insulation as well as fire retardant properties. Such a needed device would be relatively easy to manufacture, and would be readily and quickly identifiable in both lit and dark conditions. The present invention accomplishes these objectives.

SUMMARY OF THE INVENTION

The present device is a wall plate for a switch, outlet or the like (herein referred to for simplicity as "switch") that is mounted in a wall receptacle in a wall. A plate that is made from a transparent material has embedded therein a composition of powdered photoluminescent material. The plate includes a front surface, a back surface, and at least one aperture for accepting the switch therethrough and for mounting the plate onto the wall with, for example, at least one mechanical fastener.

Preferably the front surface of the plate is substantially convex, or sloped, such that between 25% and 50% of the front surface of the plate is visible from generally any angle in front of the wall. Further, the front surface of the plate may include a flat plateau for facilitating the application of indicia thereon.

The back surface of the plate includes a recessed area for receiving a gasket configured to fit at least partially within the recessed area of the plate. The gasket further includes the apertures therethrough, coaligned with the apertures of the plate. Preferably the gasket is a white, closed-cell foam material, such as a fire retardant grade polyethylene, or the like.

The present invention is a wall plate that provides stronger luminescence and longer illumination time over the prior art. Such a device is easily visible from generally any angle within a room in which the wall plate is installed, and further provides fire retardant, thermal, electrical, and draft insulating properties. The present invention is relatively easy to manufacture, and can be readily and quickly identified in both lit and dark conditions. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1A:
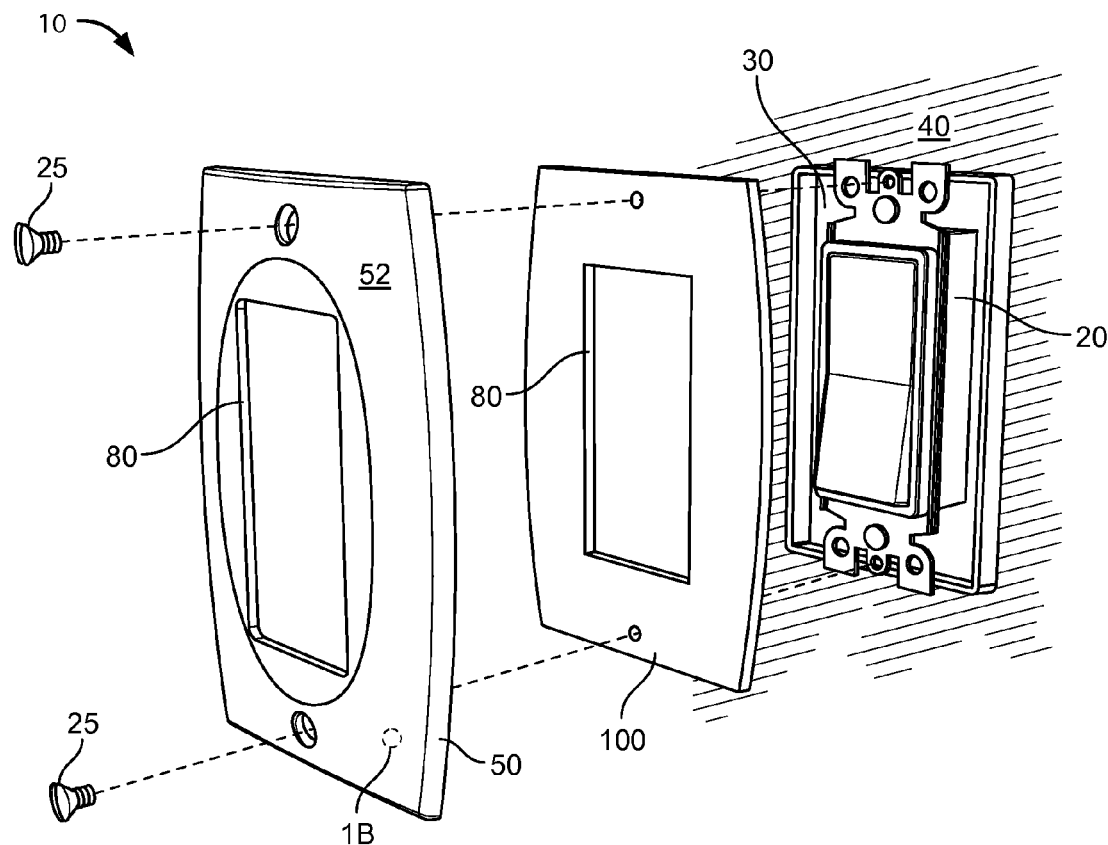
FIG. 1A is a front exploded perspective view of one embodiment of the invention, showing a plate and a gasket as fixed to a wall receptacle with mechanical fasteners.
Figure 1B:
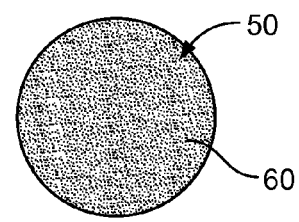
FIG. 1B is an enlarged area of the plate, taken generally along line 1B of FIG. 1A.
Figure 2:
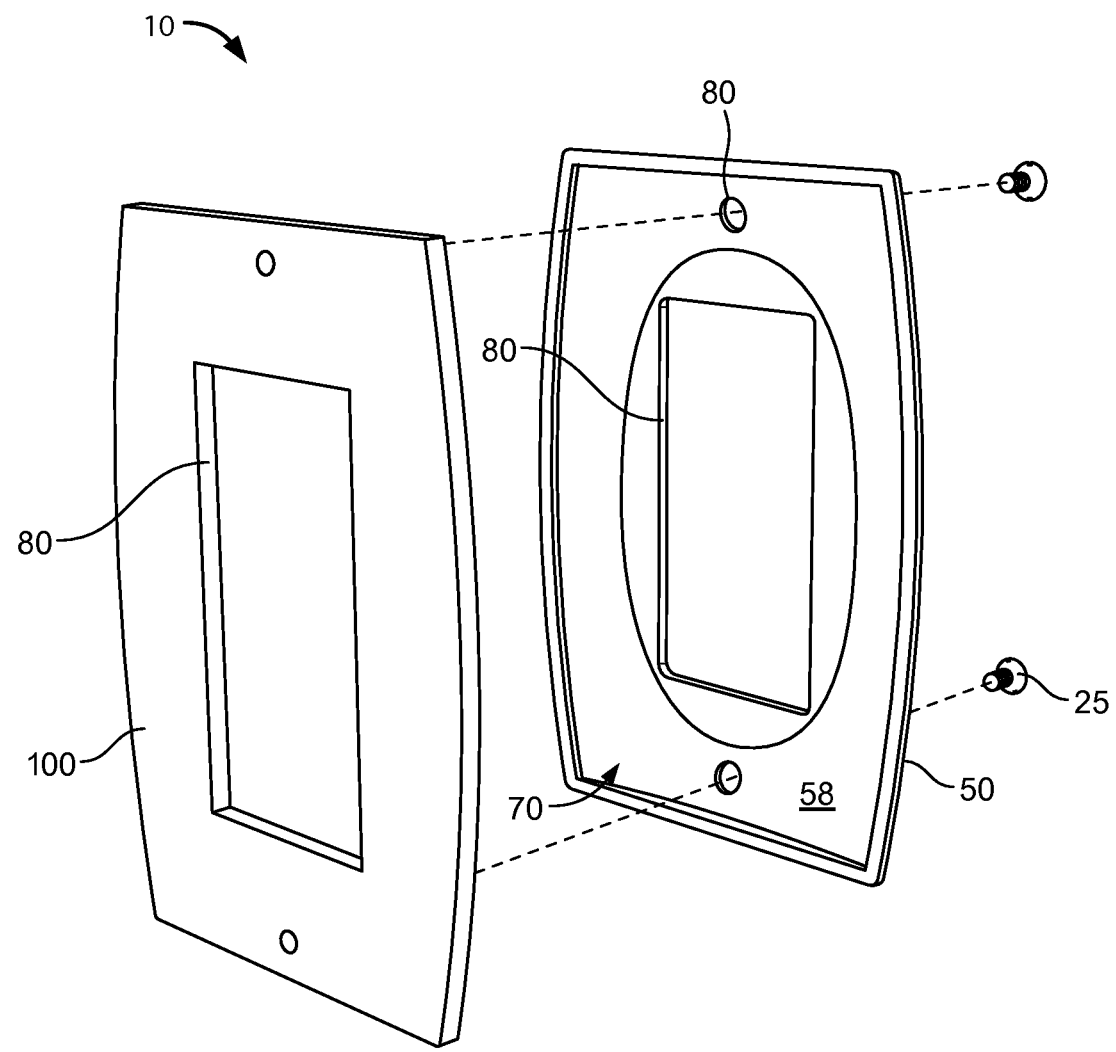
FIG. 2 is a rear exploded view of the embodiment of FIG. 1A.

FIGS. 1A, 1B and 2 illustrate a wall plate 10 for a switch 20 that is mounted in a wall receptacle 30 in a wall 40. It is understood that herein, use of the word "switch" may refer to a "Decora" style switch (FIG. 1A), a standard wall switch (not shown), a telephone or network jack (not shown), or any other type of device, electrical receptacle, or style of switch or the like that is suitable for use with the wall plate 10.

A plate 50 is made from a transparent material, such as transparent ABS plastic, polycarbonate, or the like. The plate 50 has embedded therein a composition of powdered photoluminescent material 60, such as strontium aluminates-based photoluminescent powder. The plate 50 includes a front surface 52, a back surface 58, and in all but one embodiment at least one aperture for accepting the switch 20 therethrough and for mounting the plate 50 onto the switch 20, switch receptacle 30, and/or wall 40 with, for example, at least one mechanical fastener 25. Alternately, the plate 50 may be adhered or otherwise affixed to the switch 20, switch receptacle 30, and/or wall 40.

Figure 3:
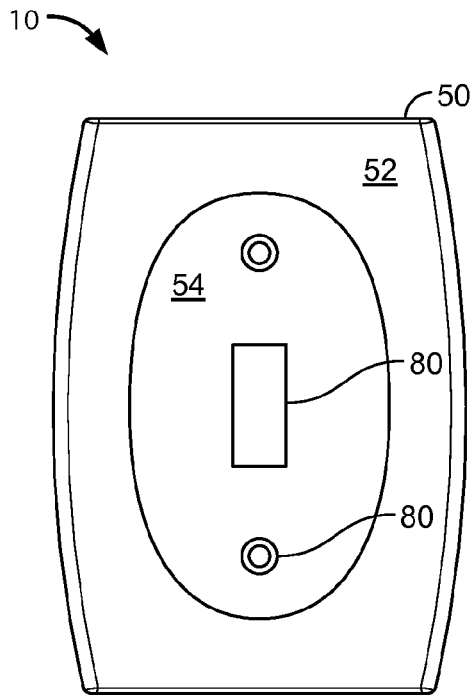
FIG. 3 is a front elevational view of the plate of an alternate embodiment of the invention.
Figure 4:
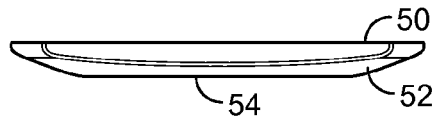
FIG. 4 is a top plan view of the embodiment of FIG. 3.
Figure 5:
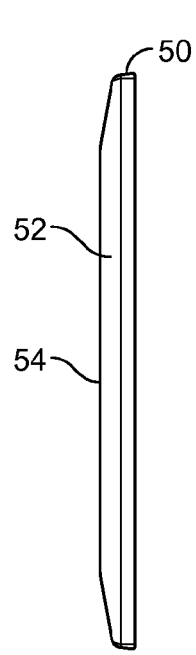
FIG. 5 is a side elevational view of the embodiment of FIG. 3.
Figure 6:
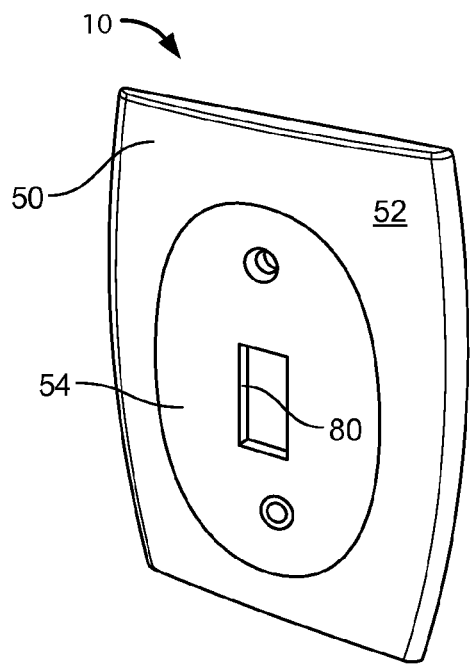
FIG. 6 is a front perspective view of the embodiment of FIG. 3.
Figure 7:
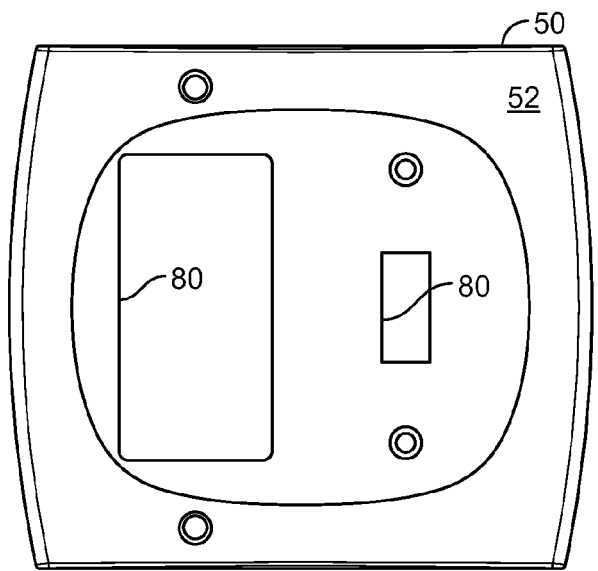
FIG. 7 is a front elevational view of the plate of an alternate embodiment of the invention.
Figure 8:
FIG. 8 is a top plan view of the embodiment of FIG. 7.
Figures 9, 10:
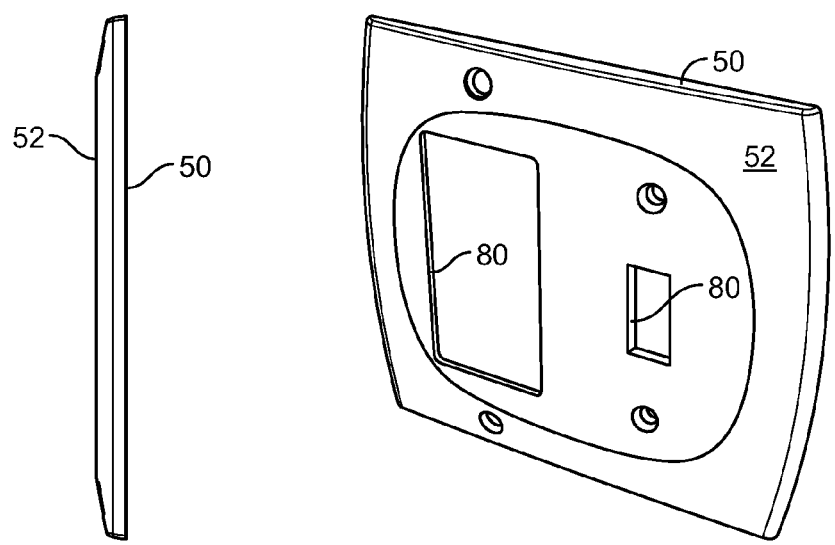
FIG. 9 is a side elevational view of the embodiment of FIG. 7.
FIG. 10 is a front perspective view of the embodiment of FIG. 7.

Preferably the front surface 52 of the plate 50 is substantially convex, that is, sloped, such that between 25% and 50% of the front surface 52 of the plate is visible from any angle in front of the wall. Such a front surface may be curved or sloped in both vertical and horizontal axes, as illustrated in FIGS. 4 and 5. Further, the front surface 52 of the plate 50 may include a flat plateau 54 (FIGS. 3 and 5) through which at least one of the apertures 80 traverses. As such, pad printing, silk screening, or other indicia application techniques may be facilitated for imprinting indicia onto the front surface 52 of the plate 50, if desired.

The back surface 58 includes a recessed area 70 for receiving a gasket 100. The gasket 100 is configured to fit at least partially within the recessed area 70 of the plate 50 and further includes the apertures 80 therethrough, coaligned with the apertures 80 of the plate 50. Preferably the gasket 100 is a white, closed-cell foam material, such as a fire retardant grade of polyethylene, or the like. As such, light traversing the plate 50 from the front surface 52 to the back surface 58 substantially reflects from the gasket 100 and back into the plate 50 to recharge the photoluminescent material 60, thereby enhancing luminescent brilliance and duration. Moreover, light emitted from the photoluminescent material through the back surface 58 of the plate 50 substantially reflects from the gasket 100 and back into the plate 50 and through the front surface 52, again enhancing glow performance. It is understood that a portion of any light reflecting back through the plate 50 may further recharge the photoluminescent material, increasing luminescent duration of the plate 50, or exit the front side 52 of the plate to enhance luminescent brilliance.

Such a gasket 100 may also be made from a fire-retardant material, preferably having relatively low water absorption characteristics so that such a gasket 100 may be used with switches 20 that are located in wet or moist environments, such as bathrooms or kitchens. Such a gasket 100 may further include anti-microbial properties and be made from a mildew and mold-resistant material. Such a gasket 100 may further be made from a thermally insulating material. White, closed-cell, non-toxic, non-conducting, fire-grade polyethylene, containing no CFC, HCFC, or hydrocarbon blowing agents is currently preferred. The gasket 100 is preferably thicker than the recessed area 70 of the plate 50 is deep, such that a plurality of the wall plates 10 may be stacked during manufacturing, packaging, or storing in such a way that the plates 50 do not contact each other, thereby avoiding scratching or damaging contact between the plates 50. Further, such an embodiment has the advantage that the gasket 100 is compressed when fixed to the switch receptacle 30 and wall 40, creating an effective heat-insulating and wind-insulating seal between the switch receptacle 30 and the room in which the wall plate 10 is installed.

While a particular form of the invention has been illustrated and described, it will be apparent that various modifications can be made without departing from the spirit and scope of the invention. For example, various apertures shapes are shown in the drawings, but these are not exhaustive of the variety of different wall plates 10 that may be manufactured. For example, so-called "two-gang" wall plates 10 may be made as illustrated in FIGS. 7-10. Further, wall plates 10 with different aperture shapes may be utilized, also as illustrated in FIGS. 7-10. Clearly, three-gang, four-gang, and wall plates 10 with a larger number of switches 20 may also be accommodated. Indeed, a wall plate 10 without any apertures 80 may be made in order to cover an unused switch receptacle 30. Accordingly, it is not intended that the invention be limited, except as by the Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be Listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A wall plate for a switch mounted in a switch receptacle in a wall, comprising:
   a plate made entirely from a transparent material having embedded therein a composition of powdered photoluminescent material, the plate comprising a front surface and a back surface, the back surface having a recessed area disposed between the switch and the back surface, the plate having a plurality of apertures for accepting the switch therethrough and for mounting the plate onto the switch with at least one mechanical fastener, the plate covering the switch receptacle and surrounding the switch mounted in the switch receptacle; and
   a gasket configured to fit at least partially within the recessed area of the plate and further including gasket apertures therethrough coaligned with the apertures of the plate, wherein the plate sandwiches the gasket between itself and the switch; and
   the front surface of the plate is substantially convex, such that between 25% and 50% of the front surface of the plate is visible from any angle in front of the wall;
   the gasket being white, whereby light traversing the plate from the front surface to the back surface substantially reflects from the gasket and back into the plate, and whereby light emitted from the photoluminescent material through the back surface of the plate substantially reflects from the gasket and back into the plate.

2. The wall plate of claim 1 wherein the gasket is made from a closed-cell fire-retardant foam material.

3. The wall plate of claim 2 wherein the gasket is made from a polyethylene material.

4. The wall plate of claim 1 wherein the gasket is made from a thermally insulating material.

5. The wall plate of claim 1 where the front surface of the plate includes a flat plateau.

6. The wall plate of claim 1 wherein the plate is made from a transparent ABS material.

7. The wall plate of claim 1 wherein the gasket is electrically non-conductive.

* * * * *